Sept. 20, 1960  H. M. GEYER  2,953,119
HYDRAULIC ACTUATOR ASSEMBLY WITH OIL CIRCULATION MEANS
Filed March 25, 1957
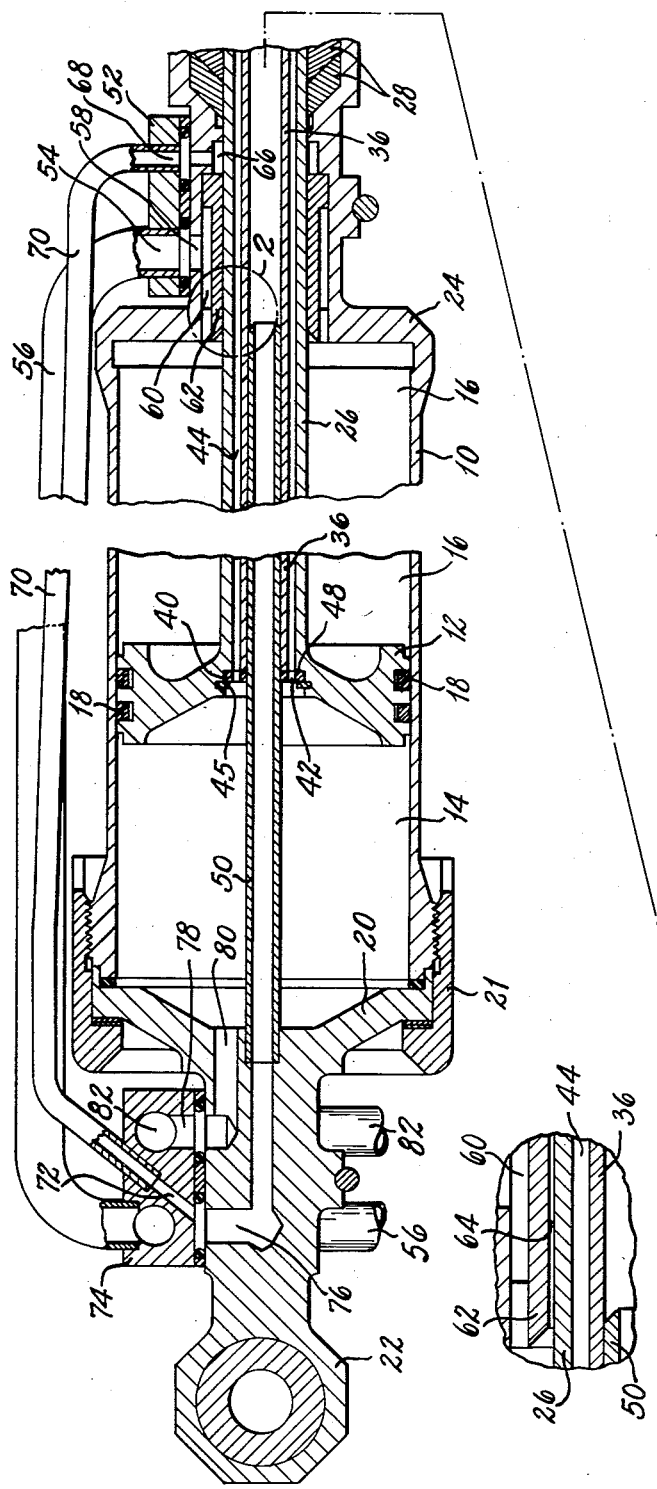
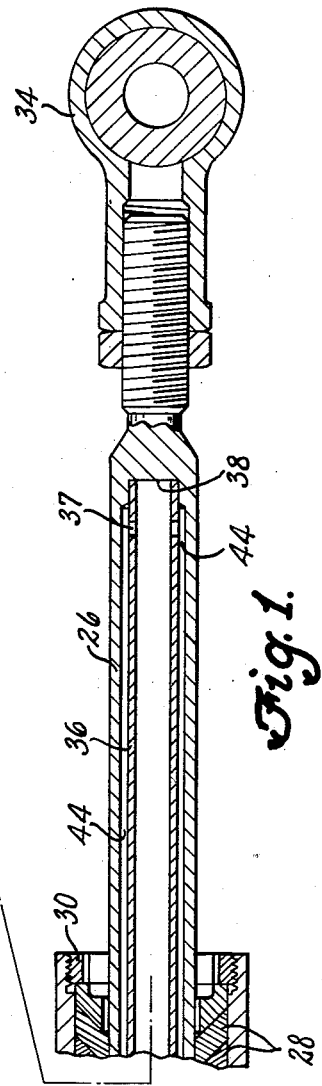
INVENTOR.
HOWARD M. GEYER
BY
D. C. Staley
ATTORNEY

United States Patent Office

2,953,119
Patented Sept. 20, 1960

2,953,119

HYDRAULIC ACTUATOR ASSEMBLY WITH OIL CIRCULATION MEANS

Howard M. Geyer, Dayton, Ohio, assignor to General Motors Corporation, Detroit, Mich., a corporation of Delaware Filed Mar. 25, 1957, Ser. No. 648,361

12 Claims. (Cl. 121—38)

This invention pertains to actuators, and particularly to hydraulic actuators designed for use in high ambient temperatures.

It is well recognized that hydraulic actuators which are subjected to high ambient temperatures in the range of 1000° F. must include means for circulating oil through the parts exposed to such high temperatures to cool these parts. Heretofore, attempts have been made to cool such hydraulic actuators by incorporating an orifice in the actuator piston through which a metered amount of oil can flow from one cylinder chamber into the hollow piston rod and back into the other cylinder chamber. An actuator assembly of this type is disclosed in my copending application, Serial No. 551,823, filed December 8, 1955, now Patent No. 2,806,450. However, it has been noted that a calibrated metering orifice in the piston is subjected to clogging due to foreign material in the oil, and once the metering orifice is clogged the circulating oil cooling system is rendered inoperative.

The present invention relates to an improved high temperature actuator assembly including a self-cleaning orifice means for circulating cooling oil. Accordingly, among my objects are the provision of a hydraulic actuator assembly having a self-cleaning orifice means for controlling the circulation of cooling fluid; the further provision of a hydraulic actuator assembly including means for circulating cooling fluid through substantially the entire length of the hollow piston rod portion thereof; and the still further provision of an actuator assembly including means for circulating fluid between opposed chambers thereof through a self-cleaning orifice to cool a hollow piston rod.

The aforementioned and other objects are accomplished by incorporating a pressure drop bushing in the actuator which constitutes a self-cleaning orifice. Specifically, the actuator includes a cylinder having a reciprocable piston therein which divides the cylinder into an extended chamber and a retract chamber. The cylinder has a head end cap at one end and a rod end cap at the other end. The piston includes an axially extending hollow rod, the outer end of which is closed, the rod extending through the rod end cap for connection to a device to be actuated. The head end cap is connected to a suitable fixed support.

A pressure drop bushing is interposed between the rod end cap and the slidable piston rod. The inner diameter of the pressure drop bushing is radially spaced a slight distance from the periphery of the piston rod. This slight annular clearance constitutes a self-cleaning orifice since during reciprocation of the piston, the rod moves relative to the pressure drop bushing.

The head end cap has a tube attached thereto which is disposed centrally within the actuator cylinder. This tube is telescopically received in a tube carried by the piston rod and disposed in the bore thereof. The tube carried by the piston rod is radially spaced from the inner wall of the piston rod so as to provide an annular passage for the flow of cooling oil to flush the piston rod, the annular passage between the hollow piston rod and the rod carried tube connecting with the extend actuator chamber.

In addition, the tube carried by the head end cap is connected by conduit means with one side of the pressure drop bushing. The other side of the pressure drop bushing communicates with the retract chamber. The extend and retract actuator chambers are connected to ports through which fluid under pressure may be directed to either the retract chamber or the extend chamber, with the opposite chamber being connected to drain. When the retract chamber is pressurized, the pressure drop bushing permits a controlled, or metered, flow of fluid between its inner diameter and the piston rod, which flow passes through the conduit means and into the tube carried by the head end cap. This fluid flows into the tube carried by the piston rod which has a plurality of openings adjacent the end of the piston rod permitting flow of fluid into the annular passage between the tube and the inner surface of the piston rod. This flushing, or cooling fluid flows to the extend chamber which is connected to drain.

When the extend chamber is pressurized and the retract chamber is connected to drain, fluid from the extend chamber passes into the annular passage between the interior of the piston rod and the piston rod carried tube and flows to the end of the piston rod where it passes into the piston rod carried tube to the stationary tube carried by the head end cap. This cooling fluid then flows through the conduit means to the rod end of the pressured drop bushing and thence to the retract chamber which is connected to drain.

Further objects and advantages of the present invention will be apaprent from the following description, reference being had to the accompanying drawing, wherein a preferred embodiment of the present invention is clearly shown.

In the drawing:

Figure 1 is a fragmentary view, partly in section and partly in elevation, of an actuator constructed according to this invention.

Figure 2 is an enlarged view taken within the circle 2 of Figure 1.

With particular reference to Figure 1, an actuator is shown including a cylinder 10 having a reciprocable piston 12 disposed therein capable of fluid pressure actuation in both directions. The piston 12 divides the cylinder 10 into an extend chamber 14 and a retract chamber 16. Since the actuator is designed primarily for high temperature applications, the piston 12 has a pair of metallic piston rings 18.

The left hand end of the cylinder 10 is closed by a head end cap 20 having a fixture 22 by which means the actuator cylinder can be connected to a fixed support, not shown. The head end cap is attached to the cylinder by a nut 21. The rod end of the cylinder 10 is closed by a rod end cap 24, which, as shown, is integral with the cylinder. The piston 12 is formed with an integral piston rod 26 which extends through the tail cap 24. A plurality of metal chevron seals 28 engage the rod 26, the seals being held in place by a nut 30.

The piston rod 26 has a bore therein, the outer end of which is closed. In addition, the outer end of the piston rod has a fixture 34 attached thereto by which means the piston rod can be connected to a device, not shown, to be actuated. A central flush tube 36 is disposed within the bore of the piston rod 26. The outer end of the flush tube 36 abuts an end wall 38 of the bore in the piston rod. In addition, the outer end of the flush tube 36 has a plurality of peripheral holes 37. The inner end of the flush tube 36 abuts a ring 40 carried by the piston 12. The ring 40 has a plurality of circumferentially spaced apertures 42 which connect with the annular passage 44 between the flush tube 36 and the inner wall of the hollow piston rod 26. The ring 40 is held in place by a snap ring 45 and abuts a shoulder 48 on the piston 12. The rod carried flush tube 36 telescopically receives the outer end of a stationary flush tube 50, the inner end of which is attached to the head end cap 20.

The rod end cap 24 has a porting block 52 attached thereto. The porting block is formed with a passage 54 which is connected by a tube 56 to a suitable control valve, not shown. The passage 54 constitutes a retract port which is connected to the retract chamber through a passage 58 in the rod end cap 24, the passage 58 being connected by an annular passage 60 between the tail end cap 24 and the outer diameter of a pressure drop bushing 62 to the retract chamber 16.

As seen particularly in Figure 2, the inner diameter of the pressure drop bushing 62 is spaced radially a slight distance from the piston rod 26, this space being indicated by numeral 64. The pressure drop bushing 62 is carried by the tail end cap 24, and the space 64 between the inner periphery of the pressure drop bushing and the piston rod 26 constitutes a self-cleaning orifice for the flow of cooling fluid through the flush tube of the piston rod in a manner to be described hereinafter. Whenever there is a pressure differential between opposite ends of the bushing 62, a metered amount of fluid can flow through the space 64. Moreover, by reason of the piston rod 26 being movable axially relative to the pressure drop bushing 62 any foreign matter which lodges in the space 64 will be removed during actuator movement. Since the piston rod 26 will operate to remove any foreign matter from the annular space 64 during movement of the piston rod 26 relative to the bushing 62, the orifice means constituted by the annular space 64 is termed self-cleaning.

The right hand side of the pressure drop bushing 64, as shown in Figure 1, connects with a passage 66 in the rod end cap 24 which connects with a passage 68 in the porting block 52. The passage 68 connects with one end of a drain tube 70, the other end of which connects with a passage 72 formed in a porting block 74 attached to the head end cap 20. The passage 72 in the porting block 74 connects with a passage 76 in the head end cap 20, the passage 76 connecting with the inner end of the stationary flush tube 50. In addition, the porting block 74 has a passage 78 which connects with a passage 80 in the head end cap 20 constituting the extend actuator port. The passage 78 connects with a tube 82 which is connected to the control valve, not shown, for controlling actuator operation.

When the retract chamber is connected to pressure and the extend chamber is connected to drain, fluid under pressure is directed to passage 54 to retract chamber 16 through passage 58 and the annular passage 60 surrounding the outer diameter of the pressure drop bushing 62. Thus, the left hand end of the pressure drop bushing 62 is subjected to the pressure potential existent in the retract chamber 16. At this time, the right hand end of the pressure drop bushing is at drain pressure since the passages 66 and 68 are connected by tube 70 to passages 72 and 76 which connect with the stationary flush tube 50. The stationary flush tube 50 in turn connects with the rod carried flush tube 36, the interior of which is connected through holes 37 to the annular passage 44 between the inner wall of the piston rod and the tube 36. Since this annular passage 44 is connected to the extend chamber 14 through apertures 42, a pressure differential exists across opposite ends of the pressure drop bushing 62. This pressure differential permits a controlled, or metered, amount of flow from the retract chamber 16 through the space 64 between the inner diameter of the pressure drop bushing and the outer diameter of the piston rod, which fluid flow passes through passages 66 and 68, the tube 70, passages 72 and 76, the tubes 50 and 36 through the openings 37, the annular passage 44, the openings 42, the extend chamber 14 to passages 80 and 78 to the tube 82. In this manner substantially the entire length of the piston rod 26 is cooled by the circulating flow of fluid. The drain flow may be directed to any suitable cooling reservoir, not shown.

When the extend chamber is pressurized and the retract chamber is connected to drain, cooling oil circulates in the reverse direction. Thus, oil will flow through apertures 42 in the ring 40 to the annular passage 44, through holes 37, through tubes 36 and 50 to passages 76 and 72. Fluid from passage 72 flows through tube 70 to passages 68 and 66. Since the retract chamber 16 is connected to drain, a pressure differential exists across the pressure drop bushing 62 and a controlled amount of fluid flows through the annular space 64 between the inner diameter of the pressure drop bushing and the piston rod 26.

From the foregoing it is manifest that the present invention incorporates self-cleaning orifice means permitting the circulation of fluid between opposed actuator chambers when they are subjected to a pressure differential. The flow of cooling fluid flushes substantially the entire length of the piston rod which is subjected to high ambient temperatures thereby maintaining the exposed parts of the actuator within a safe operating temperature range.

While the form of embodiment of the invention as herein disclosed constitutes a preferred form, it is to be understood that other forms might be adopted, as may come within the scope of the claims which follow.

What is claimed is as follows:

1. A fluid pressure operated actuator including, a cylinder, a reciprocable piston in the cylinder having a hollow rod extending therefrom with a closed outer end, self-cleaning orifice means between an end wall of the cylinder and the outer periphery of said rod permitting a metered flow of fluid therebetween due to a pressure differential across said orifice means, said piston dividing said cylinder into opposed chambers, one end of said orifice means communicating with one of said chambers, conduit means connecting the other end of said orifice means to the interior of said hollow rod adjacent the outer end thereof, and passage means connecting the outer end of said hollow rod with the other actuator chamber whereby a controlled amount of fluid may flow from one chamber to the other chamber through said orifice means, said conduit means and said passage means when there is a pressure differential between said chambers.

2. A fluid pressure operated actuator including, a cylinder, a reciprocable piston disposed in the cylinder having a hollow rod extending axially therefrom with a closed outer end, said piston dividing said cylinder into a retract chamber and an extend chamber, self-cleaning orifice means disposed between an end wall of said cylinder and the outer periphery of said piston rod, one end of said orifice means connecting with said retract chamber, conduit means connecting the other end of said orifice means to the interior of said hollow rod adjacent the outer end thereof, and passage means connecting the interior of the hollow rod with the extend chamber, said orifice means permitting a metered flow of fluid therethrough due to a pressure differential between the retract and extend chambers, the metered flow of fluid cooling substantially the entire length of the hollow piston rod.

3. A fluid pressure operated actuator including, a cylinder, a reciprocable piston disposed in the cylinder having a hollow rod extending therefrom with a closed outer end, said piston dividing the cylinder into a retract chamber and an extend chamber, a pressure drop bushing interposed between said cylinder and said piston rod, the inner surface of said pressure drop bushing being radially spaced from said rod so as to constitute a self-cleaning orifice through which a metered amount of fluid can flow due to a pressure differential across said bushing, one end of said bushing connecting with the retract chamber, conduit means connecting the other end of the bushing with said hollow piston rod adjacent the outer end thereof, and passage means connecting the outer end of said piston rod with said extend chamber whereby a pressure differential between said actuator chambers will cause a flow of fluid between said pressure drop bushing and said piston rod from one actuator chamber to the other actuator chamber throughout substantially the entire length of the hollow piston rod to effect cooling thereof.

4. A fluid pressure operated actuator assembly including in combination, a cylinder, a reciprocable piston therein having a hollow rod extending therefrom with a closed outer end, self-cleaning orifice means between one end wall of said cylinder and the outer periphery of said rod, and means directing metered flow through said orifice means throughout substantially the entire length of said hollow piston rod to effect cooling thereof.

5. A fluid pressure operated actuator assembly including in combination, a cylinder, a reciprocable piston therein having a hollow rod extending therefrom with a closed outer end, a pressure drop bushing disposed between one end of said cylinder and said rod, the inner surface of said pressure drop bushing being radially spaced from said rod so as to constitute a self-cleaning orifice through which a metered amount of fluid can flow due to a pressure differential across said bushing, and means directing the flow through said orifice throughout substantially the entire length of said hollow piston rod to effect cooling thereof.

6. A fluid pressure operated actuator assembly including in combination, a cylinder, a reciprocable piston disposed in the cylinder having a rod extending therefrom with a closed end, a first tube disposed within the hollow piston rod and radially spaced from the inner wall thereof to form a passage therebetween connected with one end of the cylinder, passage means adjacent the inner end of said first tube interconnecting the interior of the first tube with said passage, and a second tube having one end attached to said cylinder and the other end telescopically disposed within said first tube, orifice means connected with the other end of the cylinder, and conduit means interconnecting the orifice means and said second tube for directing the flow through said orifice means through said first and second tubes, the passage means in the first tube and through said passage between the first tube and the inner wall of the piston rod to effect cooling of substantially the entire length of the piston rod.

7. A fluid pressure operated actuator assembly including in combination, a cylinder, a reciprocable piston disposed therein having a hollow rod extending therefrom with a closed outer end, said piston dividing said cylinder into opposed chambers, a first tube disposed within the hollow piston rod and radially spaced from the inner wall thereof to form an annular passage therebetween, passage means in said first tube adjacent the outer end thereof interconnecting the interior of said first tube with said annular passage, a second tube having one end attached to said cylinder and the other end telescopically disposed within said first tube, means connecting the annular passage between the first tube and the inner wall of the piston rod with one of said cylinder chambers, orifice means connected with the other cylinder chamber, and means connecting said orifice means with said second tube whereby a pressure differential between said opposed cylinder chambers will cause a metered flow of fluid between said chambers through said orifice means, said means interconnecting the orifice means and the second tube, the first tube, the passage means interconnecting the first tube with the annular passage, through said annular passage and the means interconnecting the annular passage with said one cylinder chamber to effect cooling of substantially the entire length of the hollow piston rod.

8. A fluid pressure operated actuator assembly including in combination, a cylinder, a reciprocable piston therein having a hollow rod extending therefrom with a closed end, said piston dividing the cylinder into opposed chambers, a tube disposed coaxially within the hollow piston rod and radially spaced from the inner wall thereof to form an annular passage therebetween, passage means interconnecting the interior of the tube with said annular passage adjacent the outer end of the piston rod, means connecting said annular passage with one of said cylinder chambers, self-cleaning orifice means between one end wall of said cylinder and the outer periphery of said rod and connected with the other cylinder chamber, and conduit means interconnecting said orifice means with said tube whereby pressure differential between said opposing actuator chambers will cause a metered flow of fluid through said orifice means, the conduit means interconnecting the orifice means and the tube, the tube, the passage means connecting the tube with said annular passage and through the means connecting the annular passage and said one actuator chamber so as to effect cooling of substantially the entire length of the hollow piston rod.

9. The actuator assembly set forth in claim 8 wherein the conduit means interconnecting the orifice means and the first mentioned tube includes a second tube having one end attached to the cylinder and the other end telescopically disposed within the first tube.

10. A fluid pressure operated actuator assembly including in combination, a cylinder, a reciprocable piston disposed in the cylinder having a hollow rod extending therefrom with a closed end, a pressure drop bushing disposed between one end of said cylinder and said rod, said bushing being radially spaced from said rod so as to constitute a self-cleaning orifice connecting with the cylinder on one side of said piston, a first tube disposed within the hollow piston rod and radially spaced from the inner wall thereof so as to form an annular passage therebetween connected with the cylinder on the other side of the piston, passage means connecting the interior of the first tube adjacent the outer end thereof with said annular passage, a second tube having one end thereof attached to said cylinder and the other end telescopically disposed within said first tube, and conduit means interconnecting the other end of said pressure drop bushing with said second tube.

11. A fluid pressure operated actuator assembly including, a cylinder, a reciprocable piston disposed within said cylinder having a rod extending therefrom, a pressure drop bushing disposed between an end wall of said cylinder and the outer periphery of said rod, the inner surface of said pressure drop bushing being radially spaced from the outer periphery of said rod to form an orifice through which a metered amount of fluid can flow due to a pressure differential across said bushing, one end of said bushing connecting with said cylinder on one side of said piston, and means connecting the other end of said pressure drop bushing with said cylinder on the other side of said piston.

12. A fluid pressure operated actuator assembly including, a cylinder, a reciprocable piston disposed within said cylinder having a rod extending therefrom, and a pressure drop bushing disposed between an end wall of said cylinder and the outer periphery of said rod, the inner surface of said pressure drop bushing being radially spaced from the outer periphery of said rod so as to form an orifice through which a metered amount of fluid can flow due to a pressure differential across said bushing.

(References on following page)

References Cited in the file of this patent

UNITED STATES PATENTS

| | | |
|---|---|---|
| 323,749 | Stitzel | Aug. 4, 1885 |
| 639,744 | Leavitt | Dec. 26, 1899 |
| 1,454,682 | Layne | May 8, 1923 |
| 1,776,974 | Henderson | Sept. 30, 1930 |
| 2,217,239 | Smith | Oct. 8, 1940 |
| 2,347,195 | Huff | Apr. 25, 1944 |
| 2,390,602 | Maier | Dec. 11, 1945 |
| 2,688,313 | Bauer | Sept. 7, 1954 |
| 2,761,425 | Bertsch | Sept. 4, 1956 |
| 2,806,450 | Geyer | Sept. 17, 1957 |
| 2,809,611 | Van Meter | Oct. 15, 1957 |

FOREIGN PATENTS

| | | |
|---|---|---|
| 130,231 | Switzerland | Feb. 1, 1929 |